Dec. 26, 1950     A. A. PARIGIAN     2,535,951
FRONT LOADING COLLET
Filed Feb. 16, 1948
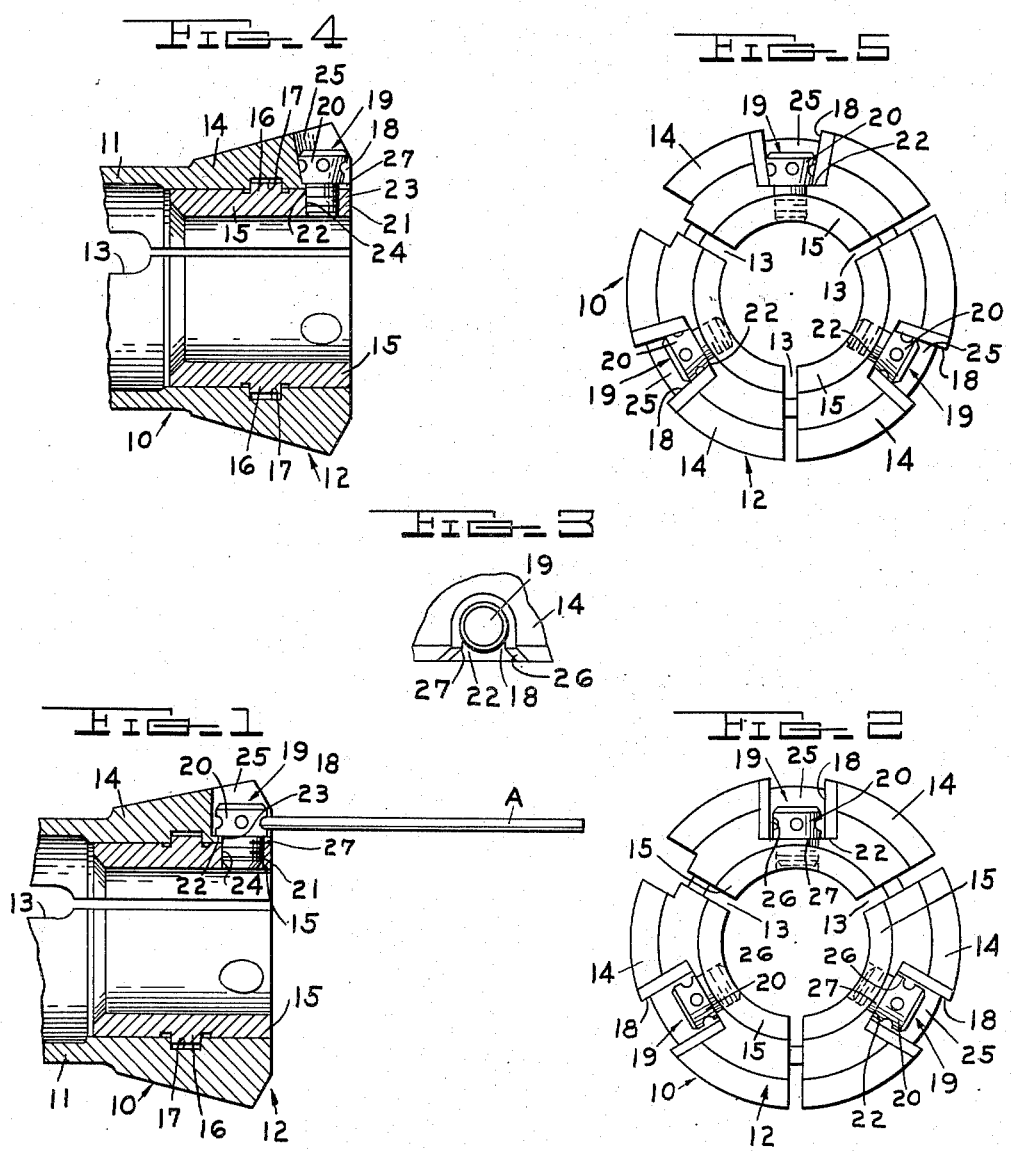
INVENTOR.
ALBERT A. PARIGIAN
BY
ATTORNEYS Patented Dec. 26, 1950

2,535,951

UNITED STATES PATENT OFFICE 2,535,951

FRONT LOADING COLLET

Albert A. Parigian, Dearborn, Mich., assignor to Modern Collet and Machine Co., Ecorse, Mich., a corporation of Michigan Application February 16, 1948, Serial No. 8,492

2 Claims. (Cl. 279—46)

This invention relates generally to collets and refers more particularly to improvements in spring jaw type collets having removable wear pads.

One of the objects of this invention is to provide a collet of the above general type wherein the pads are secured in place by readily accessible means enabling replacement of the pads while the collet remains in working position and adapted to securely hold the pads against movement relative to the collet jaws during use.

The foregoing as well as other objects will be made more apparent as this description proceeds, especially when considered in connection with the accompanying drawing, wherein:

Figure 1 is a fragmentary sectional view of a collet embodying the features of this invention;

Figure 2 is an end elevational view of the collet shown in Figure 1;

Figure 3 is a fragmentary plan view of a part of the collet;

Figure 4 is a fragmentary sectional view of a modified form of collet; and

Figure 5 is an end elevational view of the collet shown in Figure 4.

Referring first to the embodiment of the invention shown in Figures 1 to 3 inclusive, it will be noted that the numeral 10 indicates a collet comprising a tubular body 11 and an enlarged head 12. In accordance with conventional practice the head and adjacent portion of the body is formed with axially extending slots 13 spaced equal distances from each other circumferentially of the collet. In the present instance the collet is formed with three slots spaced 120° from each other, and dividing the head 12 into three arcuate spring jaws 14. For the purpose of illustrating this invention, a collet of the draw-in style is shown having the outer surface of the head 12 tapered to engage the usual collet ring (not shown) on the machine spindle and contract the jaws in gripping relation to the work.

Each jaw 14 is provided with a removable pad 15 on the inner surface thereof in the form of an arcuate segment fashioned to have a bearing contact with the inner surface of the jaw and formed intermediate the ends with an arcuate key 16 adapted to fit into a correspondingly shaped groove 17 fashioned in the adjacent surface of the jaw. Thus the pads are located axially with respect to the jaws and are positively held against movement axially relative to the respective jaws.

Each jaw 14 is also formed at the outer end with a recess 18 open through the radially outer wall of the head to receive a screw 19 having a round head 20 and having a threaded shank 21. The recess 18 in each jaw has a bottom wall 22 which is provided with an opening 23 for receiving the threaded screw shank 21 and which forms an abutment for engagement with the annular shoulder on the screw formed by the head 20. The pads 15 are respectively formed with tapped holes 24 registerable with the openings 23 to threadably engage the shanks 21 on the respective screws 19. Thus the pads may be securely clamped to their respective jaws by the screws 19 and the latter may be manipulated by engaging a tool in the form of a rod A in one of a number of holes drilled or otherwise formed in the screw heads in spaced relation circumferentially of the heads.

The recess 18 in each jaw 14 is formed with an arcuate wall 25 concentric with the axis of the associated screw 19 and the side of the wall at the outer end of the collet has an opening 26 of a width slightly greater than the diameter of the screw head 20. Also the opening 23 through the bottom wall 22 of each recess is formed with a slot 27 having a width less than the diameter of the screw head 20 but greater than the diameter of the screw shank 21. Thus the pads 15 may be removed from and installed on the respective jaws 14 from the outer end of the collet by merely backing off the screws sufficiently to enable removal of the keys 16 from the grooves 17. This greatly facilitates interchanging the pads when the latter become worn or when pads of a different size are required and enables accomplishing this result without removing the collet from the machine spindle.

The embodiment of the invention shown in Figures 4 and 5 differs from the one previously described in that provision is made for frictionally holding the screws 19 against accidental loosening during use. In detail the round head 20 on each screw is tapered outwardly from the shank 21 and the adjacent wall 25 is correspondingly tapered to have a wedging engagement with the round head. Thus a friction lock is provided preventing the screws from working loose during operation.

What I claim as my invention is:

1. A collet comprising a tubular body having spring jaws at one end and having a recess at the outer end of each jaw provided with an opening through the bottom wall thereof, a pad on the inner surface of each jaw having a tapped hole aligned with the opening in the adjacent jaw, studs having threaded shank portions respectively extending through the openings in said jaws and threadably engageable in the tapped holes in said pads, said recess having an arcuate wall generally concentric with the axis of the stud and tapered outwardly with respect to said axis, and round heads on the respective studs engageable with the bottom walls of the recesses to clamp the pads in place and tapered to have a wedging engagement with the tapered arcuate walls of the recesses.

2. A collet comprising a tubular body having spring jaws at one end and having a recess at the outer end of each jaw provided with an opening through the bottom wall thereof, a pad on the inner surface of each jaw having a tapped hole aligned with the opening in the adjacent jaw, studs having threaded shank portions respectively extending through the openings in said jaws and threadably engageable in the tapped holes in said pads, said recess having an arcuate inner wall portion generally concentric with the axis of the stud and tapered outwardly with respect to said axis, round heads on the respective studs engageable with the bottom walls of the recesses to clamp the pads in place and tapered to have a wedging engagement with the tapered arcuate wall portions of the recesses, the walls of the recesses opposite the arcuate wall portions being open to the outer sides of the jaws enabling axial movement of the heads into and out of the recesses, and the openings through the bottom walls of the recesses also being open to the outer ends of the jaws to enable free passage of the shank portions of the studs axially of the body into and out of the openings.

ALBERT A. PARIGIAN.

REFERENCES CITED

The following references are of record in the file of this patent:

UNITED STATES PATENTS

| Number | Name | Date |
|---|---|---|
| 2,291,398 | Martin | July 28, 1942 |
| 2,374,192 | Godfrey | Apr. 24, 1945 |
| 2,383,508 | Martin | Aug. 28, 1945 |